US012598540B2

(12) United States Patent
Wu

(10) Patent No.: US 12,598,540 B2
(45) Date of Patent: Apr. 7, 2026

(54) CONFIGURATION METHOD AND APPARATUS, AND TERMINAL AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 263 days.

(21) Appl. No.: 18/191,999

(22) Filed: Mar. 29, 2023

(65) Prior Publication Data

US 2023/0232312 A1 Jul. 20, 2023

Related U.S. Application Data

(63) Continuation of application No. PCT/CN2021/120659, filed on Sep. 26, 2021.

(30) Foreign Application Priority Data

Sep. 29, 2020 (CN) .......................... 202011053362.9

(51) Int. Cl.
*H04W 48/08* (2009.01)

(52) U.S. Cl.
CPC .................................. *H04W 48/08* (2013.01)

(58) Field of Classification Search
CPC .............................. H04W 48/08; H04W 48/16
USPC ....................................................... 455/422.1
See application file for complete search history.

(56) References Cited

U.S. PATENT DOCUMENTS

| | | | |
|---|---|---|---|
| 2016/0234740 A1 | 8/2016 | Kashiwase | |
| 2019/0223094 A1 | 7/2019 | Ingale et al. | |
| 2019/0274061 A1 | 9/2019 | Luo et al. | |
| 2019/0335421 A1 | 10/2019 | Park et al. | |
| 2020/0120530 A1* | 4/2020 | Luo ........................ | H04W 24/02 |
| 2020/0228382 A1 | 7/2020 | Lin et al. | |
| 2020/0260308 A1 | 8/2020 | Jin et al. | |
| 2021/0204244 A1* | 7/2021 | Rune ...................... | H04L 5/1469 |
| 2022/0124697 A1* | 4/2022 | Yao ........................ | H04W 72/20 |
| 2022/0369300 A1* | 11/2022 | Zhang ................. | H04W 52/028 |
| 2023/0072763 A1* | 3/2023 | Kim .................. | H04W 74/0841 |
| 2024/0373301 A1* | 11/2024 | Wiszniewski .. | H04W 36/00838 |

FOREIGN PATENT DOCUMENTS

| | | |
|---|---|---|
| CN | 108989011 A | 12/2018 |
| CN | 111565428 A | 8/2020 |
| CN | 111669790 A | 9/2020 |
| WO | 2017167058 A | 10/2017 |

OTHER PUBLICATIONS

ZTE Corporation et al., "Remaining issues on the cell re-selection", 3GPP TSG-RAN WG2 Meeting #109, E-Meeting, R2-2000357, Feb. 24-Mar. 6, 2020.

* cited by examiner

*Primary Examiner* — Fabricio R Murillo Garcia
(74) *Attorney, Agent, or Firm* — The Webb Law Firm

(57) ABSTRACT

A configuration method includes: receiving, by a terminal, configuration information of a working area sent by a first network side device, where the working area is used for the terminal to perform a first operation; and performing, by the terminal, the first operation in the working area based on the configuration information.

16 Claims, 4 Drawing Sheets

12

Network side
device 11          11

Terminal

Terminal

| A terminal receives configuration information of a working area sent by a first network side device, where the working area is used for the terminal to perform a first operation | S202 |
| :--- | :--- |

| The terminal performs the first operation in the working area based on the configuration information | S204 |
| :--- | :--- |

Start

A first network side device sends configuration information of a working area to a terminal, where the working area is used for the terminal to perform a first operation    ⌐ S302

End

CONFIGURATION METHOD AND APPARATUS, AND TERMINAL AND NETWORK SIDE DEVICE

CROSS-REFERENCE TO RELATED APPLICATIONS

This application is a bypass continuation application of International Application No. PCT/CN2021/120659, filed on Sep. 26, 2021, and claims priority to Chinese Patent Application No. 202011053362.9 filed on Sep. 29, 2020, the disclosures of which are hereby incorporated by reference in their entireties.

BACKGROUND OF THE INVENTION

Field of the Invention

This application belongs to the field of communication technologies, and specifically, relates to a configuration method and apparatus, a terminal, and a network side device.

Description of Related Art

In the prior art, when a large quantity of cells are present, UE needs to frequently perform mobility management operations, for example, cell selection, cell reselection, and cell measurement, to allow a terminal to frequently move among a plurality of cells, leading to high power consumption.

SUMMARY OF THE INVENTION

Embodiments of this application provide a configuration method and apparatus, a terminal, and a network side device.

According to a first aspect, a configuration method is provided, including: receiving, by a terminal, configuration information of a working area sent by a first network side device, where the working area is used for the terminal to perform a first operation; and determining, by the terminal, performing the first operation in the working area based on the configuration information.

According to a second aspect, a configuration apparatus is provided, applied to a terminal, the apparatus including: a first receiving module, configured to receive configuration information of a working area sent by a first network side device, where the working area is used for the terminal to perform a first operation; and an execution module, configured to perform the first operation in the working area based on the configuration information.

According to a third aspect, a configuration method is provided, including: sending, by a first network side device, configuration information of a working area to a terminal, where the working area is used for the terminal to perform a first operation.

According to a fourth aspect, a configuration apparatus is provided, applied to a first network side device, the apparatus including: a sending module, configured to send configuration information of a working area to a terminal, where the working area is used for the terminal to perform a first operation.

According to a fifth aspect, a terminal is provided, including a processor, a memory, and a program or an instruction stored in the memory and executable on the processor, where the program or the instruction, when executed by the processor, implements steps of the method according to the first aspect.

According to a sixth aspect, a network side device is provided, including a processor, a memory, and a program or an instruction stored in the memory and executable on the processor, where the program or the instruction, when executed by the processor, implements steps of the method according to the third aspect.

According to a seventh aspect, a non-transitory readable storage medium is provided, storing a program or an instruction, where the program or the instruction, when executed by a processor, implements steps of the method according to the first aspect, or implements steps of the method according to the third aspect.

According to an eighth aspect, a chip is provided, where the chip includes a processor and a communication interface, the communication interface is coupled to the processor, and the processor is configured to execute a program or an instruction on a network side device, to implement the method according to the first aspect, or implement the method according to the third aspect.

According to a ninth aspect, a computer software product is provided, stored in a non-volatile storage medium, where the software product is configured to be executed by at least one processor to implement steps of the method according to the first aspect, or implement steps of the method according to the third aspect.

According to a tenth aspect, a communication device is provided and configured to implement the method according to the first aspect, or implement the method according to the third aspect.

DESCRIPTION OF THE INVENTION

Figures 1, 2:
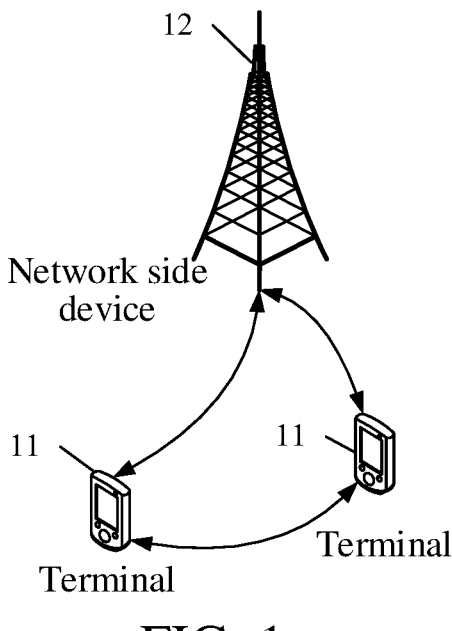
FIG. 1 is a block diagram of a wireless communication system applicable to an embodiment of this application.
FIG. 2 is a first flowchart of a configuration method according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application shall fall within the protection scope of this application.

The specification and claims of this application, and terms "first" and "second" are used to distinguish similar objects, but are not used to describe a specific sequence or order. It may be understood that the data used in such a way is interchangeable in proper circumstances, so that the embodiments of this application can be implemented in other sequences than the sequence described or described herein. Objects distinguished by "first" and "second" generally belong to the same category, and the quantity of the objects are not limited. For example, a first object may be one or more objects. In addition, "and/or" in this specification and the claims represents at least one of the connected objects. The character "/" generally indicates that the associated objects are in an "or" relationship.

First, related terms in the embodiments of this application are introduced:

1. IDLE or INACTIVE UE Mobility

During the movement of IDLE (UE in an idle state) or INACTIVE UE (UE in an inactive state), a network provides a priority of each frequency.

For intra-frequency neighboring cells, if a measurement evaluation value (calculated according to a measurement result of a target (or neighboring) cell added with an offset) of a target (or neighboring) cell is better than that (calculated according to a measurement result of a serving cell added with an offset) of a serving cell for a period of time (such as, a duration configured by the network), and UE camps in a current serving cell longer than a period of time (such as, 1s specified in a protocol), the UE reselects the target (or neighboring) cell.

For high-priority inter-frequency or inter radio access technology (inter-RAT) neighboring cells, if a measurement evaluation value of a target (or neighboring) cell is greater than a threshold for a period of time (such as, a duration configured by the network), the UE reselects the target (or neighboring) cell.

For low-priority inter-frequency or inter radio access technology (inter-RAT) neighboring cells, if for a long time (such as, a duration configured by the network), a measurement evaluation value of a target (or neighboring) cell is greater than a threshold and a measurement evaluation value of a current serving cell is less than the threshold, the UE reselects the target (or neighboring) cell.

For inter-frequency or inter radio access technology (inter-RAT) neighboring cells, when a priority of a target (or neighboring) frequency is the same as that of a current serving (or camping) frequency, a cell reselection method and the cell reselection method for intra-frequency cells.

The IDLE/INACTIVE UE triggers a connection establishment process by receiving a paging message sent by a network side, so as to send and receive data.

2. Separation of a Centralized Unit (CU) and a Distributed Unit (DU)

In a 5th-generation (5G) system, a base station (gNB) can place protocol stack entities thereof on different control units. For example, a radio resource control (RRC) protocol and a packet data convergence protocol (PDCP) are placed on a CU, and a radio link control (RLC) protocol and a media access control (MAC) layer/physical layer (PHY) are placed on a DU. The CU and the DU both have a management permission for radio resources. For example, the CU can use an RRC message to manage cells connected to the CU, and the DU can a MAC control element (CE) message to manage cells connected to the DU. A plurality of DUs are connected to one CU, and the CU is connected to a core network and other CUs.

It is worth noting that, the technology described in the embodiments of this application is not limited to a long term evolution (LTE)/LTE-advanced (LTE-A) system, and may further be applied to other wireless communication systems, such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" in the embodiments of this application are generally used interchangeably. The described technology can be applied to the systems and radio technologies mentioned above, and can also be applied to other systems and radio technologies. However, for exemplary purposes, the following descriptions describe a new radio (NR) system and use NR terms in most of the following descriptions. However, these technologies may also be applied to applications other than NR system applications, such as a 6th Generation (6G) communication system.

FIG. 1 is a block diagram of a wireless communication system applicable to an embodiment of this application. The wireless communication system includes a terminal 11 and a network side device 12. The terminal 11 may also be referred to as a terminal device or user equipment (UE). The terminal 11 may be a terminal-side device, such as a mobile phone, a tablet personal computer, a laptop computer that is also referred to as a notebook computer, a personal digital assistant (PDA), a palmtop computer, a netbook, an ultra-mobile personal computer (UMPC), a mobile internet device (MID), a wearable device or a vehicle user equipment (VUE), and a pedestrian user equipment (PUE). The wearable device includes: a wristband, a headset, eyeglasses, and the like. It is to be noted that, a specific type of the terminal 11 is not limited in the embodiments of this application. The network side device 12 may be a base station or a core network. The base station may be referred to as a node B, an evolved node B, an access point, a base transceiver station (BTS), a radio base station, a radio transceiver, a basic service set (BSS), an extended service set (ESS), a B node, an evolved node B (eNB), a home B node, a home evolved node B, a wireless local area network (WLAN) access point, a wireless fidelity (WiFi) node, a transmitting receiving point (TRP), or another appropriate term in the art. As long as the same technical effect can be achieved, the base station is not limited to a particular technical term. It is to be noted that only a base station in the NR system is used as an example in the embodiments of the application, but a specific type of the base station is not limited.

A configuration method provided in the embodiments of this application is described in detail below with reference to the accompanying drawings by using some embodiments and application scenarios thereof.

An embodiment of this application provides a configuration method. FIG. 2 is a first flowchart of a configuration method according to an embodiment of this application. As shown in FIG. 2, the method includes the following steps.

Step S202. A terminal receives configuration information of a working area sent by a first network side device, where the working area is used for the terminal to perform a first operation.

Optionally, the first operation in the embodiments of this application includes at least one of the following: receiving a paging message, cell selection, cell reselection, camping, or cell measurement.

Step S204. The terminal performs the first operation in the working area based on the configuration information.

Through step S202 and step S204, the terminal can receive the configuration information of the working area sent by the first network side device, and then determine, by using the configuration information, a working area used for performing the first operation. For example, the first operation is: receiving a paging message, cell selection, cell reselection, camping, or cell measurement. The terminal performs the first operation only in the working area, thereby avoiding frequent movement of the terminal among a plurality of working areas and reducing power consumption of the terminal. In this way, the problem that in the prior art, when a large quantity of cells exist, a terminal needs to frequently perform mobility management operations, and frequent movement of the terminal among a plurality of cells leads to high power consumption is resolved.

It is to be noted that, during the performing, by the terminal, the first operation in the working area based on the configuration information, the terminal stops performing the first operation outside the working area. For example, the first operation is cell selection or reselection. The terminal performs the cell selection or reselection only in cells configured in the working area. In a case that the first operation is camping, the terminal camps only in a cell configured in the working area. In a case that the first operation is cell measurement, the terminal measures only a cell or frequency configured in the working area.

In an optional implementation of the embodiments of this application, the configuration information in the embodiments of this application includes at least one of the following:

1) an identifier of a frequency; such as, f1;

2) resource location information of a reference signal corresponding to a frequency; such as: a time location (such as, slot 1/2/3) or a frequency location; or a spatial location (such as, an associated reference signal identifier);

3) a subcarrier spacing (SCS) corresponding to a frequency; such as, 15 KHz;

4) transmission location information of a paging message; such as, a time location (or a frequency location; or a spatial location (such as, an associated reference signal identifier)) of a scheduling channel used for scheduling transmission of control signaling by using a paging message, and/or a time location (or a frequency location; or a spatial location (such as, an associated reference signal identifier)) of a data channel used for transmitting a paging message;

5) an identifier of a working area; for example, a frequency 1 belongs to a working area 1, and a frequency 2 belongs to a working area 2; or 6) a correspondence relationship between an identifier of a working area and a target parameter, where the target parameter includes at least one of the following: an identifier of a frequency, resource location information of a reference signal, a subcarrier spacing corresponding to the frequency, or transmission location information of a paging message.

In addition, it is to be further noted that the correspondence relationship between an identifier of a working area and a target parameter in the embodiments of this application includes at least one of the following:

1) an identifier of one working area corresponds to an identifier or identifiers of one or more frequencies;

2) an identifier of one working area corresponds to resource location information of one or more reference signals;

3) an identifier of one working area corresponds to one or more SCSs; or 4) an identifier of one working area corresponds to transmission location information of one or more paging messages.

In an optional implementation of the embodiments of this application, the reference signal in the embodiments of this application is used for indicating the identifier of the working area. That is, the reference signal includes information content of the identifier of the working area. The reference signal may be generated based on the identifier of the working area.

Optionally, the reference signal in the embodiments of this application includes a synchronization signal block (SSB) and/or a channel state information-reference signal (CSI-RS).

Optionally, in the embodiments of this application, an association relationship exists between the transmission location information of the paging message and the resource location information of the reference signal, and the association relationship is configured by a network side device or specified in a protocol. It is to be noted that, the network side device may be a first network side device or a network side device different from the first network side device. Therefore, in some application scenarios, for example, a location of a scheduling channel of scheduling an i-th paging message in one paging cycle corresponds to resource location information of a j-th reference signal. When detecting the j-th reference signal, the terminal listens to scheduling information of a paging message in the scheduling channel of scheduling the i-th paging message.

Optionally, in the embodiments of this application, in a case that a plurality of frequencies are provided, priorities corresponding to the plurality of frequencies are configured by a network side device or specified in a protocol. It is to be noted that, the network side device may be a first network side device or a network side device different from the first network side device. For example, in a case that a frequency 1 takes priority over a frequency 2, when performing cell selection or reselection, the terminal preferentially selects the frequency 1 as a working frequency of the terminal. However, the frequency 1 and the frequency 2 are both in the working area. If a frequency 3 is outside the working area, even if a priority of the frequency 3 is higher than that of the frequency 1, the terminal does not select the frequency 3 as the working frequency.

This application is described below by using examples with reference to some implementations of the embodiments of this application.

In the implementations, the network side device configures two working areas. A working area-1 is in a normal work mode, and configuration information of the working area-1 is from system information. A working area-2 is in a special work mode, and configuration information of the working area-2 is from a connection release message and is used for UE-1 in an IDLE and/or an INACTIVE state. When the UE-1 in an IDLE and/or an INACTIVE state is within coverage of the working area-2, the UE-1 works in the working area-2, for example, receives a paging message, and/or performs cell selection or reselection, and/or camps. When the UE-1 leaves the coverage of the working area-2, the UE-1 enters the working area-1 and works in the working area-1, for example, receives a paging message, and/or performs cell selection or reselection, and/or camps.

Optionally, in some application scenarios, the foregoing correspondence relationship between an identifier of a working area and a target parameter may be: frequencies corresponding to the working area-1 are f1 and f2, resource location information of a reference signal corresponding to the working area-1 is a slot 1 and a slot 2, an SCS corresponding to the working area-1 is 15 KHz, and transmission location information of a paging message corresponding to the working area-1 is a time location of a scheduling channel used for scheduling transmission of control signaling by using a paging message. In this case, when the terminal is within coverage of the working area-1, the terminal works only on the frequencies f1 and f2 corresponding to the working area-1, or works only on the slot 1 and the slot 2 corresponding to the working area-1, or works only within the 15-KHz SCS of the working area-1, or the like. That is, in a case that the terminal is within the coverage of the working area-1, the terminal works only on resources corresponding to the working area-1, and does not work on resources of other working areas. Similarly, in a case that the terminal is within coverage of another working area, the terminal works only on resources of another working area, and does not work on the resources of the working area-1.

That is, when the terminal works in a particular cell or frequency of the working area, the terminal does not work in a frequency or cell outside the particular working area. The foregoing working area-1 and working area-2 are still used as an example. In a case that the UE-1 in an IDLE and/or an INACTIVE state works in a frequency-1 (or cell-1) within the coverage of the particular working area-2, the terminal may measure only a particular signal in the working area-2, and does not need to measure a signal of the working area-1. A particular cell or frequency in the working area-2 is configured by a network or specified in a protocol.

It is also possible that when a measurement result of the terminal in a particular working area is greater than a threshold, the terminal does not measure a frequency or a cell outside the working area. The foregoing working area-1 and working area-2 are still used as an example. In a case that a measurement result of SSB measured by the UE-1 in an IDLE and/or an INACTIVE state in the particular working area-2 is greater than or equal to a threshold, the UE may measure a particular signal in the working area-2 and does not need to measure a signal of the working area-1. The threshold is configured by a network or specified in a protocol. A measurement reference signal corresponding to the measurement result is configured by a network or specified in a protocol.

In the implementations of the embodiments of this application, the terminal can perform a particular operation on particular resources in a working area, and does not perform the particular operation outside the working area, for example, camping; receiving a paging message; cell reselection or selection; and cell measurement, thereby avoiding a case that frequent movement among a plurality of cells leads to a power loss in mobility management, for example, frequent measurement of the plurality of cells.

This application is described above from a terminal side of the embodiments of this application. A configuration process of this application is described below from a network side.

Figures 3, 4, 5:
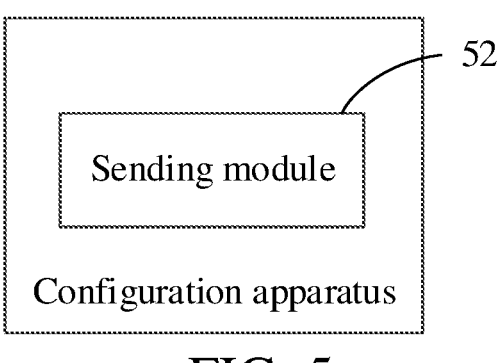
FIG. 3 is a second flowchart of a configuration method according to an embodiment of this application.
FIG. 4 is a first schematic structural diagram of a configuration apparatus according to an embodiment of this application.
FIG. 5 is a second schematic structural diagram of a configuration apparatus according to an embodiment of this application.

An embodiment of this application further provides a configuration method. FIG. 3 is a second flowchart of a configuration method according to an embodiment of this application. As shown in FIG. 3, the method includes the following steps.

Step S302. A first network side device sends configuration information of a working area to a terminal, where the working area is used for the terminal to perform a first operation.

Optionally, before the first network side device sends the configuration information of the working area to the terminal, the method in the embodiments of this application further includes the following steps.

Step S301. The first network side device receives the configuration information of the working area sent by a second network side device; or the first network side device receives first configuration information sent by the second network side device, where content of the first configuration information is content that the second network side device expects the first network side device to configure for the configuration information of the working area.

Optionally, the first network side device or the second network side device in the embodiments of this application is any one of the following: a centralized unit (CU), a distributed unit (DU), a gNB, and a centralized control node of a core network service.

The centralized control node of a core network service may be an access and mobility management function (AMF), or another control node.

Optionally, the first network side device in the embodiments of this application may be a neighboring node of the second network side device; or the first network side device may be a node for managing the working area.

In an optional implementation of the embodiments of this application, the configuration information in the embodiments of this application includes at least one of the following:

1) an identifier of a frequency; such as, f1;

2) resource location information of a reference signal corresponding to a frequency; such as: a time location (such as, slot 1/2/3) or a frequency location; or a spatial location (such as, an associated reference signal identifier);

3) an SCS corresponding to a frequency; such as, 15 KHz;

4) transmission location information of a paging message; such as, a time location (or a frequency location; or a spatial location (such as, an associated reference signal identifier)) of a scheduling channel used for scheduling transmission of control signaling by using a paging message, and/or a time location (or a frequency location; or a spatial location (such as, an associated reference signal identifier)) of a data channel used for transmitting a paging message;

5) an identifier of a working area; for example, a frequency 1 belongs to a working area 1, and a frequency 2 belongs to a working area 2; or 6) a correspondence relationship between an identifier of a working area and a target parameter, where the target parameter includes at least one of the following: an identifier of a frequency, resource location information of a reference signal, a subcarrier spacing corresponding to the frequency, or transmission location information of a paging message.

In addition, it is to be further noted that the correspondence relationship between an identifier of a working area and a target parameter in the embodiments of this application includes at least one of the following:

1) an identifier of one working area corresponds to an identifier or identifiers of one or more frequencies;

2) an identifier of one working area corresponds to resource location information of one or more reference signals;

3) an identifier of one working area corresponds to one or more SCSs; or 4) an identifier of one working area corresponds to transmission location information of one or more paging messages.

In an optional implementation of the embodiments of this application, the reference signal in the embodiments of this application is used for indicating the identifier of the working area. That is, the reference signal includes information content of the identifier of the working area. The reference signal may be generated based on the identifier of the working area.

Optionally, the reference signal in the embodiments of this application includes an SSB and/or a CSI-RS.

Optionally, in the embodiments of this application, an association relationship exists between the transmission location information of the paging message and the resource location information of the reference signal, and the association relationship is configured by a network side device or specified in a protocol. It is to be noted that, the network side device may be a first network side device or a second network side device, or a network side device different from the first network side device and the second network side device. Therefore, in some application scenarios, for example, a location of a scheduling channel of scheduling an i-th paging message in one paging cycle corresponds to resource location information of a j-th reference signal. When detecting the j-th reference signal, the terminal listens to scheduling information of a paging message in the scheduling channel of scheduling the i-th paging message.

Optionally, in the embodiments of this application, in a case that a plurality of frequencies are provided, priorities corresponding to the plurality of frequencies are configured by a network side device or specified in a protocol. For example, in a case that a frequency 1 takes priority over a frequency 2, when performing cell selection or reselection, the terminal preferentially selects the frequency 1 as a working frequency of the terminal. However, the frequency 1 and the frequency 2 are both in the working area. If a frequency 3 is outside the working area, even if a priority of the frequency 3 is higher than that of the frequency 1, the terminal does not select the frequency 3 as the working frequency.

It is to be noted that, an execution entity of the configuration method provided in the embodiments of this application may be a configuration apparatus, or a control module configured to perform the configuration method in the configuration apparatus. In the embodiments of this application, a configuration apparatus provided in the embodiments of this application is described by using an example in which the configuration method is performed by the configuration apparatus.

An embodiment of this application provides a configuration apparatus. The apparatus is applied to a terminal. FIG. 4 is a first schematic structural diagram of a configuration apparatus according to an embodiment of this application. As shown in FIG. 4, the apparatus includes:

a first receiving module 42, configured to receive configuration information of a working area sent by a first network side device, where the working area is used for the terminal to perform a first operation; and an execution module 44, configured to perform the first operation in the working area based on the configuration information.

Optionally, the first operation in the embodiments of this application includes at least one of the following: receiving a paging message, cell selection, cell reselection, camping, or cell measurement.

Optionally, the apparatus in the embodiments of this application may further include: a stop module, configured to: during the performing the first operation in the working area based on the configuration information, stop performing the first operation outside the working area.

Optionally, the configuration information in the embodiments of this application may further include at least one of the following:

1) an identifier of a frequency; such as, f1;

2) resource location information of a reference signal corresponding to a frequency; such as: a time location (such as, slot 1/2/3) or a frequency location; or a spatial location (such as, an associated reference signal identifier);

3) an SCS corresponding to a frequency; such as, 15 KHz;

4) transmission location information of a paging message; such as, a time location (or a frequency location; or a spatial location (such as, an associated reference signal identifier)) of a scheduling channel used for scheduling transmission of control signaling by using a paging message, and/or a time location (or a frequency location; or a spatial location (such as, an associated reference signal identifier)) of a data channel used for transmitting a paging message;

5) an identifier of a working area; for example, a frequency 1 belongs to a working area 1, and a frequency 2 belongs to a working area 2; or 6) a correspondence relationship between an identifier of a working area and a target parameter, where the target parameter includes at least one of the following: an identifier of a frequency, resource location information of a reference signal, a subcarrier spacing corresponding to the frequency, or transmission location information of a paging message.

In addition, it is to be further noted that the correspondence relationship between an identifier of a working area and a target parameter in the embodiments of this application includes at least one of the following:

1) an identifier of one working area corresponds to an identifier or identifiers of one or more frequencies;

2) an identifier of one working area corresponds to resource location information of one or more reference signals;

3) an identifier of one working area corresponds to one or more SCSs; or 4) an identifier of one working area corresponds to transmission location information of one or more paging messages.

Optionally, the reference signal in the embodiments of this application is used for indicating the identifier of the working area.

Optionally, the reference signal in the embodiments of this application includes a synchronization signal block SSB and/or a channel state information reference signal CSI-RS.

Optionally, in the embodiments of this application, an association relationship exists between the transmission location information of the paging message and the resource location information of the reference signal, and the association relationship is configured by a network side device or specified in a protocol.

Optionally, in the embodiments of this application, in a case that a plurality of frequencies are provided, priorities corresponding to the plurality of frequencies are configured by a network side device or specified in a protocol.

It may be learnt that, in the embodiments of this application, the terminal can receive the configuration information of the working area sent by the first network side device, and then determine, by using the configuration information, a working area used for performing the first operation. For example, the first operation is: receiving a paging message, cell selection, cell reselection, camping, or cell measurement. The terminal performs the first operation only in the working area, thereby avoiding frequent movement of the terminal among a plurality of working areas and reducing power consumption of the terminal. In this way, the problem that in the prior art, when a large quantity of cells exist, a terminal needs to frequently perform mobility management operations, and frequent movement of the terminal among a plurality of cells leads to high power consumption is resolved.

This application is introduced above from a terminal side, and is introduced below from a network side.

An embodiment of this application provides a configuration apparatus. The apparatus is applied to a first network side device. FIG. 5 is a second schematic structural diagram of a configuration apparatus according to an embodiment of this application. As shown in FIG. 5, the apparatus includes:

a sending module 52, configured to send configuration information of a working area to a terminal, where the working area is used for the terminal to perform a first operation.

Optionally, the apparatus in the embodiments of this application may further include: a second receiving module, configured to: before the configuration information of the working area is sent to the terminal, receive the configuration information of the working area sent by a second network side device; or a third receiving module, configured to: before the configuration information of the working area is sent to the terminal, receive first configuration information sent by the second network side device, where content of the first configuration information is content that the second network side device expects the first network side device to configure for the configuration information of the working area.

Optionally, the first network side device or the second network side device in the embodiments of this application is any one of the following: a centralized unit (CU), a distributed unit (DU), a gNB, and a centralized control node of a core network service.

Optionally, the first network side device in the embodiments of this application is a neighboring node of the second network side device; or the first network side device is a node for managing the working area.

Optionally, the configuration information in the embodiments of this application includes at least one of the following:

1) an identifier of a frequency; such as, f1;

2) resource location information of a reference signal corresponding to a frequency; such as: a time location (such as, slot 1/2/3) or a frequency location; or a spatial location (such as, an associated reference signal identifier);

3) an SCS corresponding to a frequency; such as, 15 KHz;

4) transmission location information of a paging message; such as, a time location (or a frequency location; or a spatial location (such as, an associated reference signal identifier)) of a scheduling channel used for scheduling transmission of control signaling by using a paging message, and/or a time location (or a frequency location; or a spatial location (such as, an associated reference signal identifier)) of a data channel used for transmitting a paging message;

5) an identifier of a working area; for example, a frequency 1 belongs to a working area 1, and a frequency 2 belongs to a working area 2; or 6) a correspondence relationship between an identifier of a working area and a target parameter, where the target parameter includes at least one of the following: an identifier of a frequency, resource location information of a reference signal, a subcarrier spacing corresponding to the frequency, or transmission location information of a paging message.

In addition, it is to be further noted that the correspondence relationship between an identifier of a working area and a target parameter in the embodiments of this application includes at least one of the following:

1) an identifier of one working area corresponds to an identifier or identifiers of one or more frequencies;

2) an identifier of one working area corresponds to resource location information of one or more reference signals;

3) an identifier of one working area corresponds to one or more SCSs; or 4) an identifier of one working area corresponds to transmission location information of one or more paging messages.

Optionally, the reference signal in the embodiments of this application is used for indicating the identifier of the working area.

Optionally, the reference signal in the embodiments of this application includes a synchronization signal block (SSB) and/or a channel state information reference signal (CSI-RS).

Optionally, in the embodiments of this application, an association relationship exists between the transmission location information of the paging message and the resource location information of the reference signal, and the association relationship is configured by a network side device or specified in a protocol.

Optionally, in the embodiments of this application, in a case that a plurality of frequencies are provided, priorities corresponding to the plurality of frequencies are configured by a network side device or specified in a protocol.

The configuration apparatus in the embodiments of this application may be an apparatus, or may be a component, an integrated circuit, or a chip in the terminal. The apparatus may be a mobile terminal or may be a non-mobile terminal. For example, the mobile terminal may include, but is not limited to, the types of the terminal 11 listed above. The non-mobile terminal may be a server, a network attached storage (NAS), a personal computer (PC), a television (TV), a teller machine, a self-service machine, or the like, which is not specifically limited in the embodiments of this application.

The configuration apparatus in the embodiments of this application may be an apparatus with an operating system. The operating system may be an Android operating system, may be an ios operating system, or may be another possible operating system, which is not specifically limited in the embodiments of this application.

The configuration apparatus provided in the embodiments of this application can implement all processes implemented by the method embodiments shown in FIG. 2 to FIG. 3, and the same technical effects can be achieved. To avoid repetition, details are not described herein again.

Figure 6:
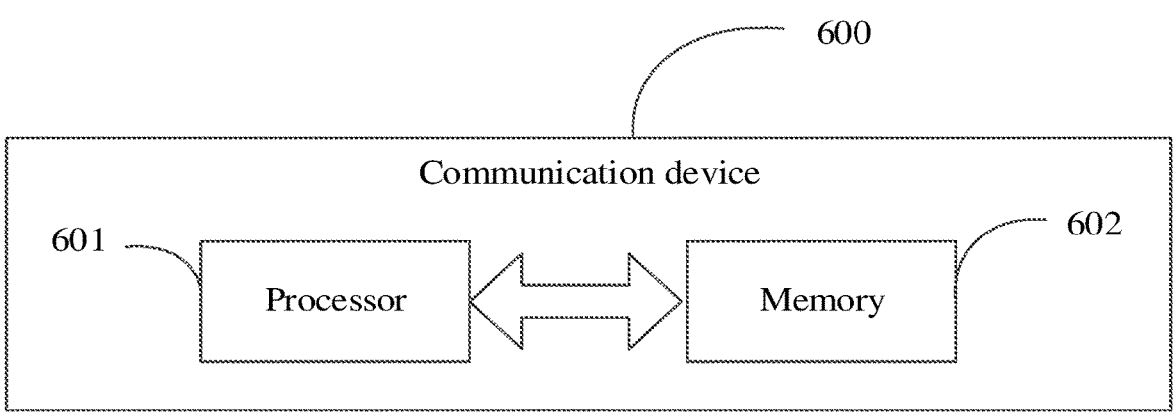
FIG. 6 is a schematic structural diagram of a communication device according to an embodiment of this application.

Optionally, as shown in FIG. 6, an embodiment of this application further provide a communication device 600, including a processor 601, a memory 602, and a program or an instruction stored in the memory 602 and executable on the processor 601. For example, when the communication device 600 is a terminal, the program or the instruction, when executed by the processor 601, implements various processes of the embodiments of the configuration method, and the same technical effects can be achieved. When the communication device 600 is a network side device, the program or the instruction, when executed by the processor 601, implements various processes of the embodiments of the configuration method, and the same technical effects can be achieved. To avoid repetition, details are not described herein again.

Figure 7:
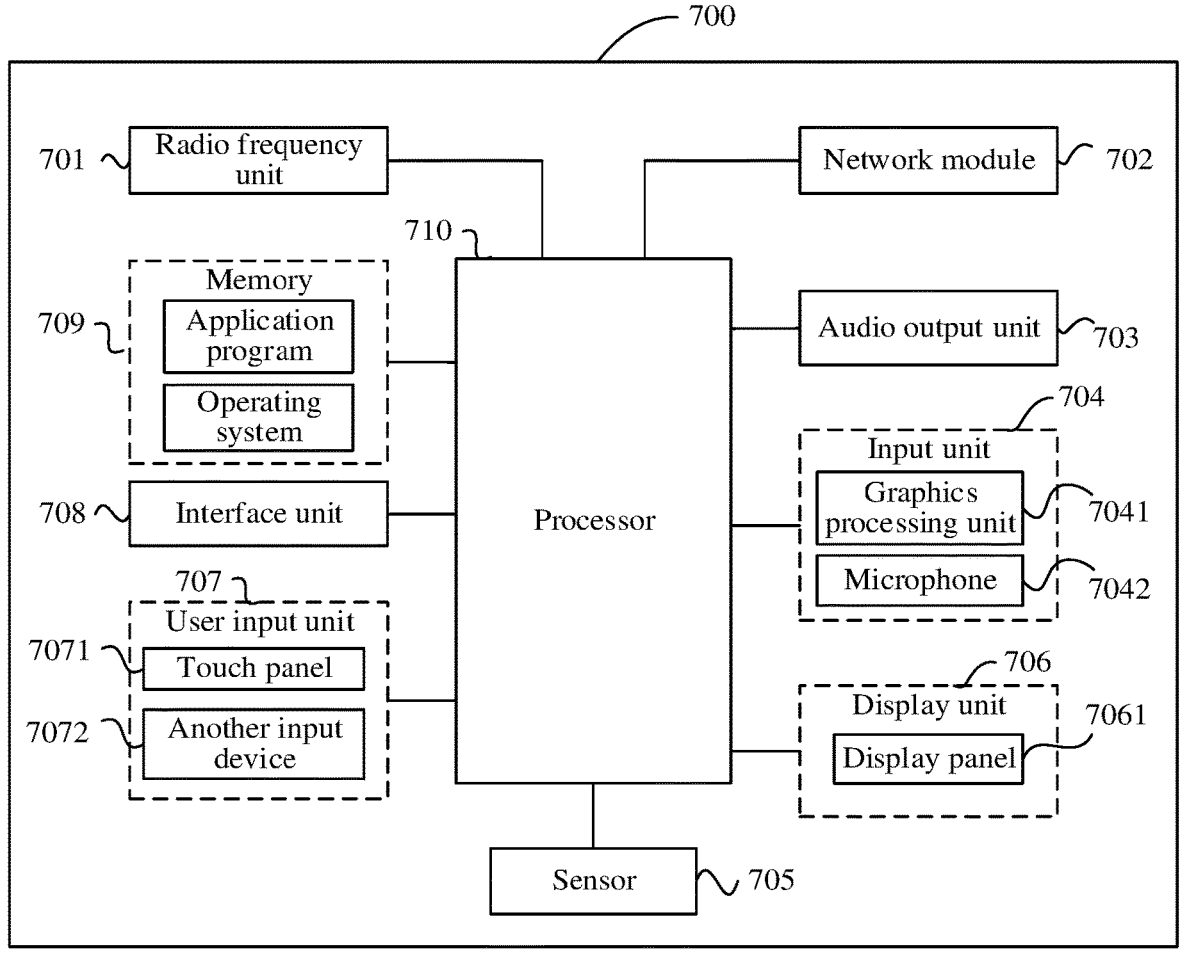
FIG. 7 is a schematic diagram of a hardware structure of a terminal according to an embodiment of this application.

FIG. 7 is a schematic diagram of a hardware structure of a terminal according to an embodiment of this application.

The terminal 700 includes, but is not limited to: components such as a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 may further include a power supply (such as a battery) for supplying power to the components. The power supply may be logically connected to a processor 110 by using a power management system, thereby implementing functions such as charging, discharging, and power consumption management by using the power management system. A terminal structure shown in FIG. 7 does not constitute a limitation to the terminal, and the terminal may include more or fewer components than those shown in FIG. 7, or some components may be combined, or a different component deployment may be used, which is not described herein again.

It is to be understood that, in the embodiments of this application, the input unit 704 may include a graphics processing unit (GPU) 7041 and a microphone 7042. The graphics processing unit 7041 performs processing on image data of a static picture or a video that is obtained by an image acquisition device (for example, a camera) in a video acquisition mode or an image acquisition mode. The display unit 706 may include a display panel 7061. The display panel 7061 may be configured in the form of a liquid crystal display, an organic light-emitting diode, or the like. The user input unit 707 includes a touch panel 7071 and another input device 7072. The touch panel 7071 is also referred to as a touchscreen. The touch panel 7071 may include two parts: a touch detection apparatus and a touch controller. The another input device 7072 may include, but is not limited to, a physical keyboard, a functional key (such as a volume control key or a switch key), a track ball, a mouse, and a joystick, which are not described herein in detail.

In the embodiments of this application, the radio frequency unit 701 receives downlink data from a network side device and then transmits the downlink data to the processor 710 for processing, and sends uplink data to the network side device. Generally, the radio frequency unit 701 includes, but is not limited to, an antenna, at least one amplifier, a transceiver, a coupler, a low noise amplifier, a duplexer, and the like.

The memory 709 may be configured to store a software program or instructions and various data. The memory 709 may mainly include a program or an instruction storage area and a data storage area. The program or instruction storage area may store an operating system, an application program or an instruction required by at least one function (for example, a sound playback function and an image display function), and the like. Besides, the memory 709 may include a high speed random access memory, and may further include a non-volatile memory. The non-volatile memory may be a read-only memory (ROM), a programmable ROM (PROM), an erasable PROM (EPROM), an electrically EPROM (EEPROM), or a flash memory, for example, at least one magnetic disk storage device, a flash memory, or another non-volatile solid-state storage device.

The processor 710 may include one or more processing units. Optionally, the processor 710 may integrate an application processor and a modem processor, where the application processor mainly processes an operating system, a user interface, an application program or an instruction, and the like, and the modem processor mainly processes wireless communication, such as a baseband processor. It may be understood that, the modem processor may not be integrated into the processor 710.

The radio frequency unit 701 is configured to receive configuration information of a working area sent by a first network side device, where the working area is used for the terminal to perform a first operation.

The processor 710 is configured to perform the first operation in the working area based on the configuration information.

Optionally, the processor 110 is further configured to stop performing the first operation outside the working area.

It may be learnt that, in the embodiments of this application, the terminal can receive the configuration information of the working area sent by the first network side device, and then determine, by using the configuration information, a working area used for performing the first operation, by using the configuration information, the working area used for performing the first operation. For example, the first operation is: receiving a paging message, cell selection, cell reselection, camping, or cell measurement. The terminal performs the first operation only in the working area, thereby avoiding frequent movement of the terminal among a plurality of working areas and reducing power consumption of the terminal. In this way, the problem that in the prior art, when a large quantity of cells exist, a terminal needs to frequently perform mobility management operations, and frequent movement of the terminal among a plurality of cells leads to high power consumption is resolved.

Figure 8:
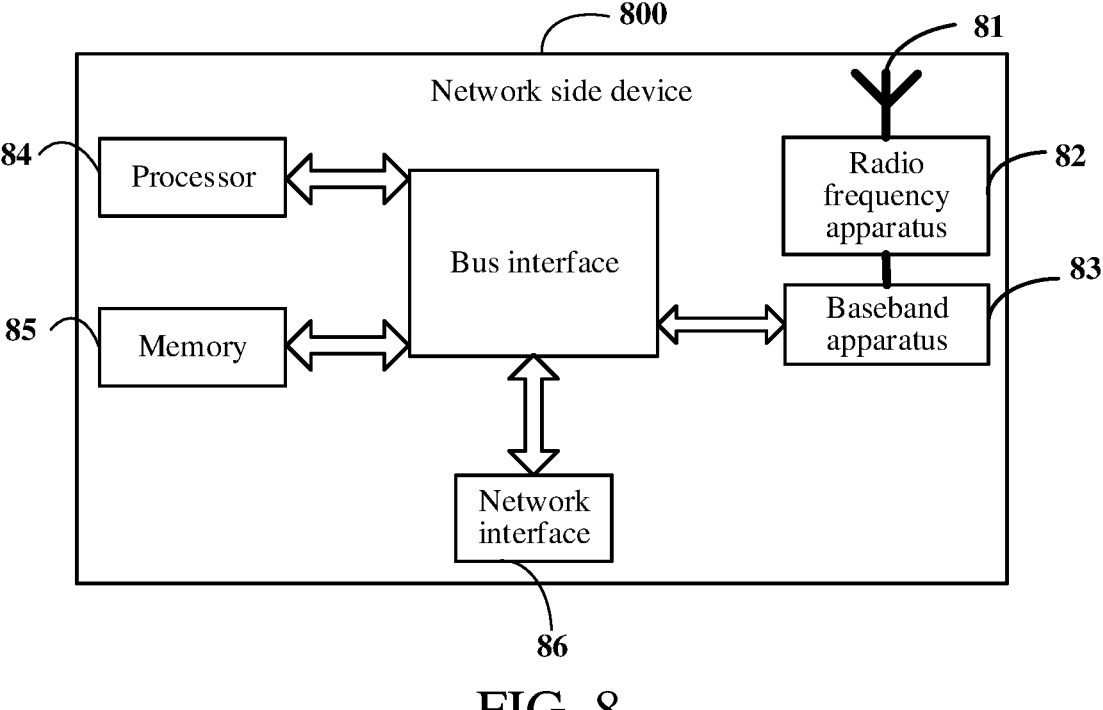
FIG. 8 is a schematic structural diagram of a network side device according to an embodiment of this application.

An embodiment of this application further provides a network side device. As shown in FIG. 8, the network device 800 includes: an antenna 81, a radio frequency apparatus 82, and a baseband apparatus 83. The antenna 81 is connected to the radio frequency apparatus 82. In an uplink direction, the radio frequency apparatus 82 receives information through the antenna 81, and sends the received information to the baseband apparatus 83 for processing. In a downlink direction, the baseband apparatus 83 processes to-be-sent information, and sends the information to the radio frequency apparatus 82. The radio frequency apparatus 82 processes the information and sends the information through the antenna 81.

The foregoing frequency band processing apparatus may be located in the baseband apparatus 83, the method executed by the network side device in the foregoing embodiments may be implemented in the baseband apparatus 83, and the baseband apparatus 83 includes a processor 84 and a memory 85.

The baseband apparatus 83 may include, for example, at least one baseband plate. A plurality of chips are disposed on the baseband plate. As shown in FIG. 8, one of the plurality of chips is, for example, the processor 84, and is connected to the memory 85, to invoke a program in the memory 85 to perform the operations of the network device in the foregoing method embodiments.

The baseband apparatus 83 may further include a network interface 86, configured to exchange information with the radio frequency apparatus 82. The interface is, for example, a common public radio interface (CPRI).

In some embodiments, the network side device of the embodiments of this application further includes: an instruction or program stored in the memory 85 and executable on the processor 84, where the processor 84 invoke the instruction or program in the memory 85 to perform the method performed by the modules shown in FIG. 5, and the same technical effects can be achieved. To avoid repetition, details are not described herein again.

An embodiment of this application further provides a non-transitory readable storage medium, storing a program or an instruction. The program or the instruction, when executed by a processor, implements the processes of the foregoing configuration method embodiments, and the same technical effects can be achieved. To avoid repetition, details are not described herein again.

The processor is the processor in the terminal in the foregoing embodiment. The non-transitory readable storage medium includes a non-transitory computer-readable storage medium, for example, a read-only memory (ROM), a random access memory (RAM), a magnetic disk, an optical disc, or the like.

An embodiment of this application further provides a chip, including a processor and a communication interface. The communication interface is coupled to the processor. The processor is configured to execute a program or an instruction on a network side device, to implement all processes of the foregoing configuration method embodiments, and the same technical effects can be achieved. To avoid repetition, details are not described herein again.

It is to be understood that, the chip mentioned in the embodiments of this application may also be referred to as a system-level chip, a system chip, a chip system, a system-on-a-chip chip, or the like.

It is to be noted that, the terms "comprise", "include", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be noted that the scope of the methods and apparatuses in the implementations of this application is not limited to performing functions in the order shown or discussed, and may further include performing functions in a substantially simultaneous manner or in a reverse order according to the functions involved, for example, the described methods may be performed in an order different from the order described, and various steps may be added, omitted, or combined. In addition, features described with reference to some examples may be combined in other examples.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but such implementation is not to be considered beyond the scope of the present disclosure.

A person skilled in the art may clearly understand that for convenience and conciseness of description, for specific working processes of the foregoing systems, apparatuses and units, reference may be made to the corresponding processes in the foregoing method embodiments, and details are not described herein again.

In the embodiments provided in this application, it is to be understood that the disclosed apparatuses and methods may be implemented in other manners. For example, the described apparatus embodiments are only exemplary. For example, the division of the units is only a logical function division and may be other divisions during actual implementation. For example, a plurality of units or components may be combined or integrated into another system, or some features may be ignored or not performed. In addition, the shown or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may be physically separated, or two or more units may be integrated into one unit.

Through the descriptions of the foregoing implementations, a person skilled in the art may clearly understand that the method according to the foregoing embodiments may be implemented by using software and a necessary general hardware platform, and certainly, may alternatively be implemented by hardware, but in many cases, the former manner is a better implementation. Based on such an understanding, the technical solutions of this application essentially or the part contributing to the prior art may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, a network device, or the like) to perform the methods described in the embodiments of this application.

It may be understood that the embodiments described in the embodiments of the present disclosure may be implemented by hardware, software, firmware, middleware, microcode, or a combination thereof. For hardware implementation, modules, units, and subunits may be implemented by one or more application-specific integrated circuits (ASICs), a digital signal processor (DSP), a digital signal processor device (DSPD), a programmable logic device (PLD), a field programmable gate array (FPGA), a general-purpose processor, a controller, a microcontroller, a microprocessor, and other electronic units configured to implement the functions of the present disclosure, or a combination thereof.

For implementation by software, the technologies in the embodiments may be implemented by performing the functional modules (for example, a process and a function) in the embodiments of the present disclosure. Software code may be stored in a memory and executed by a processor. The memory may be implemented inside or outside the processor.

The embodiments of this application have been described above with reference to the accompanying drawings. This application is not limited to the specific embodiments described above, and the specific embodiments described above are merely exemplary and not limitative. Those of ordinary skill in the art may make various variations under the teaching of this application without departing from the spirit of this application and the protection scope of the claims, and such variations shall all fall within the protection scope of this application.

What is claimed is:

1. A configuration method, comprising:
receiving, by a terminal, configuration information of a working area sent by a first network side device, wherein the working area is used for the terminal to perform a first operation; and
performing, by the terminal, the first operation in the working area based on the configuration information; wherein
the configuration information comprises at least one of the following:
an identifier of a frequency, resource location information of a reference signal corresponding to a frequency, a subcarrier spacing (SCS) corresponding to a frequency, transmission location information of a paging message, an identifier of a working area, or a correspondence relationship between an identifier of a working area and a target parameter; wherein
the target parameter comprises at least one of the following: an identifier of a frequency, resource location information of a reference signal, a subcarrier spacing corresponding to a frequency, or transmission location information of a paging message; wherein
the first operation comprises at least one of the following: receiving a paging message, cell selection, cell reselection, camping, or cell measurement.

2. The method according to claim 1, wherein during performing, by the terminal, the first operation in the working area based on the configuration information, the method further comprises:
stopping, by the terminal, performing the first operation outside the working area.

3. The method according to claim 1, wherein the correspondence relationship between the identifier of the working area and the target parameter comprises at least one of the following:
an identifier of one working area corresponds to an identifier or identifiers of one or more frequencies;
an identifier of one working area corresponds to resource location information of one or more reference signals;
an identifier of one working area corresponds to one or more SCSs; or
an identifier of one working area corresponds to transmission location information of one or more paging messages.

4. The method according to claim 1, wherein the reference signal is used for indicating the identifier of the working area.

5. The method according to claim 4, wherein the reference signal comprises a synchronization signal block (SSB) and/or a channel state information reference signal (CSI-RS).

6. The method according to claim 1, wherein the transmission location information of the paging message and the resource location information of the reference signal have an association relationship, and the association relationship is configured by a network side device or specified in a protocol.

7. The method according to claim 1, wherein in a case that a plurality of frequencies are provided, priorities corresponding to the plurality of frequencies are configured by a network side device or specified in a protocol.

8. A configuration method, comprising:
sending, by a first network side device, configuration information of a working area to a terminal, wherein the working area is used for the terminal to perform a first operation; wherein
the configuration information comprises at least one of the following:
an identifier of a frequency, resource location information of a reference signal corresponding to a frequency, a subcarrier spacing (SCS) corresponding to a frequency, transmission location information of a paging message, an identifier of a working area, or a correspondence relationship between an identifier of a working area and a target parameter; wherein
the target parameter comprises at least one of the following: an identifier of a frequency, resource location information of a reference signal, a subcarrier spacing corresponding to a frequency, or transmission location information of a paging message; wherein
the first operation comprises at least one of the following: receiving a paging message, cell selection, cell reselection, camping, or cell measurement.

9. The method according to claim 8, wherein before the sending, by the first network side device, configuration information of the working area to the terminal, the method further comprises:
receiving, by the first network side device, the configuration information of the working area sent by a second network side device; or
receiving, by the first network side device, first configuration information sent by the second network side device, wherein content of the first configuration information is content that the second network side device expects the first network side device to configure for the configuration information of the working area.

10. The method according to claim 9, wherein the first network side device or the second network side device is any one of the following: a centralized unit (CU), a distributed unit (DU), a gNB, and a centralized control node of a core network service.

11. The method according to claim 9, wherein the first network side device is a neighboring node of the second network side device; or the first network side device is a node for managing the working area.

12. The method according to claim 8, wherein the correspondence relationship between the identifier of the working area and the target parameter comprises at least one of the following:
an identifier of one working area corresponds to an identifier or identifiers of one or more frequencies;
an identifier of one working area corresponds to resource location information of one or more reference signals;
an identifier of one working area corresponds to one or more SCSs; or
an identifier of one working area corresponds to transmission location information of one or more paging messages.

13. The method according to claim 8, wherein the reference signal is used for indicating the identifier of the working area.

14. The method according to claim 13, wherein the reference signal comprises a synchronization signal block (SSB) and/or a channel state information reference signal (CSI-RS).

15. The method according to claim 8, wherein the transmission location information of the paging message and the resource location information of the reference signal have an association relationship, and the association relationship is configured by a network side device; or in a case that a plurality of frequencies are provided, priorities corresponding to the plurality of frequencies are configured by a network side device.

16. A terminal, comprising a processor, a memory, and a program or an instruction stored in the memory and executable on the processor, wherein the program or the instruction, when executed by the processor, causes the terminal to:

receive configuration information of a working area sent by a first network side device, wherein the working area is used for the terminal to perform a first operation; and perform the first operation in the working area based on the configuration information; wherein the configuration information comprises at least one of the following:

an identifier of a frequency, resource location information of a reference signal corresponding to a frequency, a subcarrier spacing (SCS) corresponding to a frequency, transmission location information of a paging message, an identifier of a working area, or a correspondence relationship between an identifier of a working area and a target parameter; wherein the target parameter comprises at least one of the following: an identifier of a frequency, resource location information of a reference signal, a subcarrier spacing corresponding to a frequency, or transmission location information of a paging message, wherein the first operation comprises at least one of the following:

to receive a paging message, cell selection, cell reselection, camping, or cell measurement.

* * * * *